United States Patent [19]
Bergeron

[11] 4,375,789
[45] Mar. 8, 1983

[54] FIRST OUT INDICATOR
[75] Inventor: Ned A. Bergeron, Houma, La.
[73] Assignee: B.W.B. Controls, Inc., Houma, La.
[21] Appl. No.: 176,002
[22] Filed: Aug. 7, 1980
[51] Int. Cl.³ .............................................. F15B 13/04
[52] U.S. Cl. ..................................... 116/70; 116/112;
116/266; 116/273; 137/553; 137/625.66
[58] Field of Search ................. 116/70, 112, 266, 202;
137/553, 525.66

[56]  References Cited
U.S. PATENT DOCUMENTS

| 2,786,437 | 3/1957 | Oakes | 116/70 |
| 3,474,906 | 10/1969 | Tennis | 116/70 |
| 3,594,745 | 7/1971 | Nickels | 116/70 |
| 3,910,223 | 10/1975 | Krohn | 116/70 |
| 4,263,938 | 4/1981 | Peters | 137/625.66 |

FOREIGN PATENT DOCUMENTS
1546611  10/1968  France .................................. 116/70

Primary Examiner—Robert I. Smith
Attorney, Agent, or Firm—Bode & Smith

[57]  ABSTRACT

Control system for indicating which, of a plurality of sensed functions, first malfunctions. The system includes a plurality of series connected devices, each such device includes a shiftable valve which, in one position activates an indicator, and, in another position deactivates said indicator. Signalling connections link the devices such that all indicators, save the one governing the first malfunction, remain in the indicating condition they were in prior to such malfunction occurring.

4 Claims, 3 Drawing Figures

FIRST OUT INDICATOR

BACKGROUND OF THE INVENTION

In the production of energy, a particular production site, such as an offshore platform, may require the continuous monitoring of numerous variables. Any one of such variables may, on a malfunction occurring, cause a shutdown of the entire system. Quick detection of the particular malfunction is desirable. The trial and error system is time consuming, and thereby is costly. This invention has as its prime goal the provision of a control system which may be used to monitor a number of variables, yet indicate the site of an initial malfunction.

SUMMARY OF THE INVENTION

A plurality of indicators are series connected intermediate a source of pressurized fluid and the controlled or regulated equipment, such as wellhead valve actuators. Each indicator would also be in communication with a particular monitored device, such as a production line. Such communication may be through an intermediate pilot control. By virtue of the series connection, the output of one indicator leads to the input of the succeeding one. The last of the series would be linked to the regulated equipment, and may be linked to the initial pressurized fluid source. Each indicator includes a shiftable valve which, in one position causes a signal to be emitted indicating operativeness, and, in another position causes a signal to be emitted indicating inoperativeness. On a particular malfunction occurring, pressure would be bled. Supply pressure on the inlet side shifts the valve to the position which causes the inoperativeness signal to be emitted. Such shifting opens a vent which exhausts downstream supply pressure and thereafter shuts off the supply reservoir. The valves in the remaining indicators remain in the position they were in at the time of the initial malfunction. Thus, an operator can readily detect the source of the initial malfunction, make necessary repairs, and reactivate the system.

DESCRIPTION OF A PREFERRED EMBODIMENT

Figure 1:
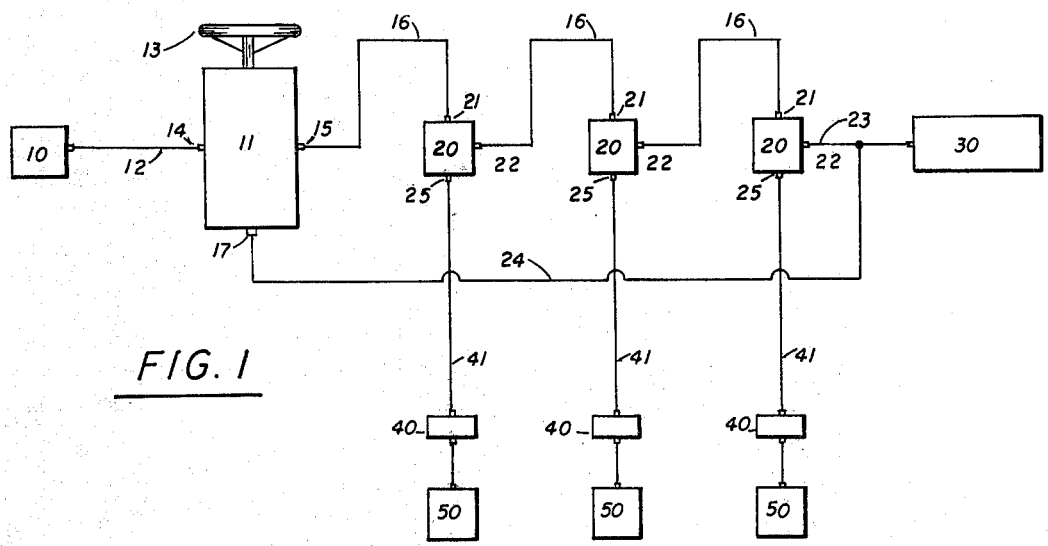
FIG. 1 is a schematic of the entire system having a series of indicators.

Consider first the schematic of FIG. 1, depicting the series arrangement. A reservoir, or source of supply, 10, would supply pressurized fluid through a conduit 12 to supply inlet 14 of control device 11. Such control device may be of the type generally illustrated by U.S. Pat. Nos. 3,963,050 or 3,877,484, which permits a supply pressure to pass therethrough so long as a sensed pressure is present. Such controls oftentimes, for safety reasons, require manual activation of handle 13 to reactivate the system. Said control device 11 would normally pass supply fluid out supply exit 15 through supply conduit 16 to supply inlet 21 of the first of series connected indicators 20. Such supply fluid then would normally leave supply exit 22 through supply conduit 16 to the next series connected indicator 20. The last such indicator would have its exit conduit 23 linked both to the regulated equipment 30, which may be a wellhead valve actuator, and by return conduit 24 to sensed pressure inlet 17 of control device 11. Each indicator 20 also has control or pilot fluid inlet 25 whereby pilot or like control device 40 supplies control fluid from a source not shown, to indicators 20 through conduits 41 so long as the variable being monitored in elements 50 fall within acceptable limits. Elements 50 may be production lines, and the variable may be pressure, for example. Control devices, such as Type "R" pilots manufactured by B.W.B. Controls, Inc., pass a supply pressure so long as a sensed pressure falls within an acceptable range.

Figure 2:
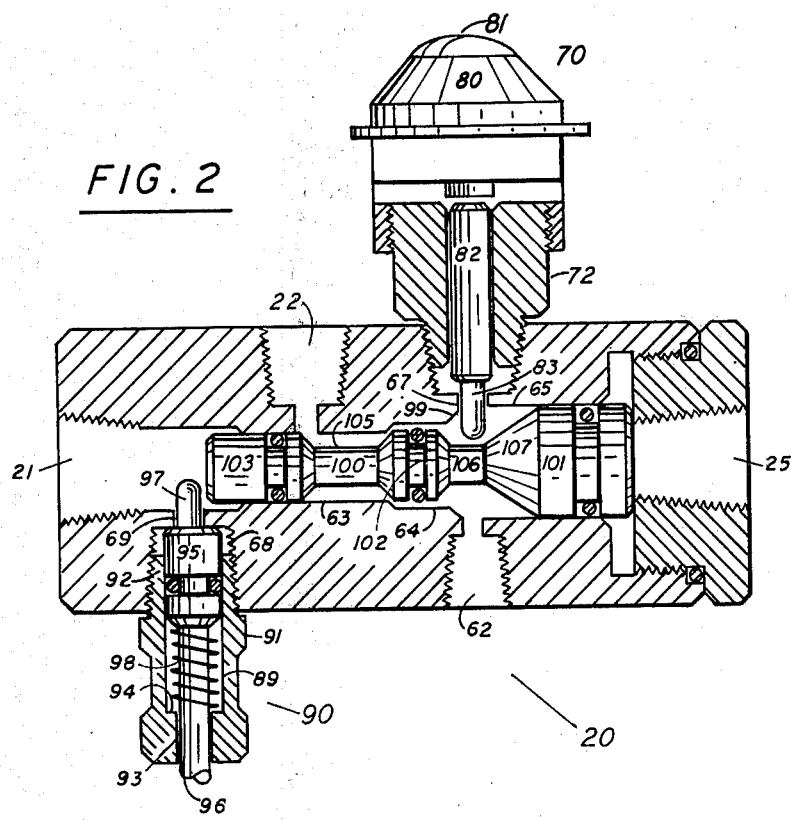
FIG. 2 is a partial axial section through the indicator of this invention, showing the valve in a position to indicate inoperativeness.
Figure 3:
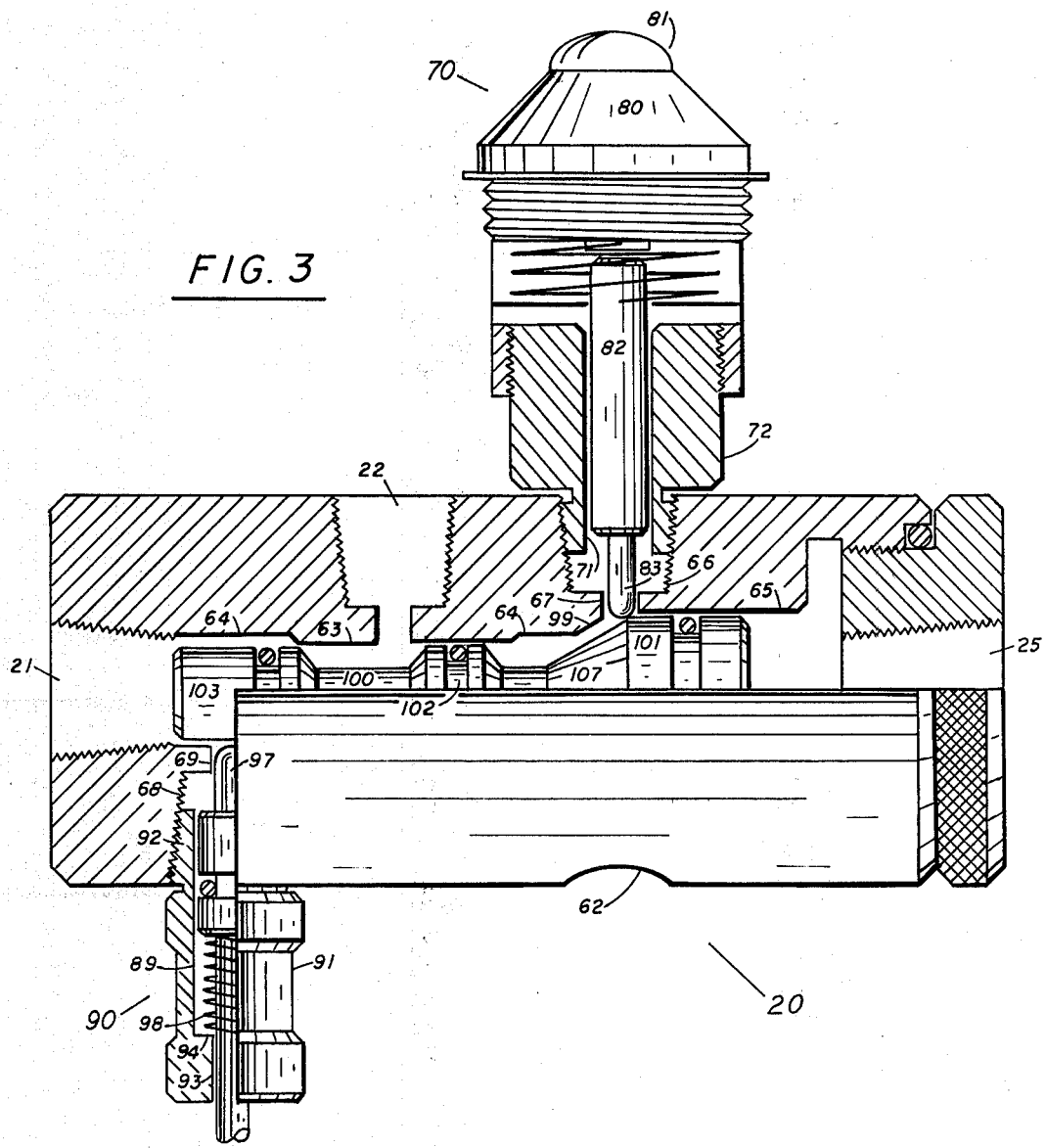
FIG. 3 is a section similar to that of FIG. 2, but showing the valve in a position to indicate operativeness.

Moving now to FIGS. 2 and 3, which illustrate the indicators 20 of this invention, the former showing the valve in inoperative condition and the latter in an operative state. As earlier mentioned, each indicator includes a fluid supply inlet 21 as well as a control fluid inlet 25. Further, said indicators possess supply fluid outlet 22 and vent or exhaust 62. Each of said inlets, outlets and vents communicates with a centrally disposed longitudinal bore. Said bore includes central section 63, enlarged counter bores 64 positioned opposite section 63, and greatly enlarged counter bore 65 adjacent control fluid inlet 25.

Also communicating with the longitudinal bore are two pin carrying members. Signal 70 includes a cylindrical body 72 which has a threaded lug extension 71 which engages a threaded tap 66. Threadedly mated with said cylindrical body is a signalling member 80. Such a member, exemplified by a commercially available product sold under the mark WINKIE LIGHT, includes a dual colored, rotatable mask. The particular color apparent under dome 81 is a function of pressure exacted by axially movable piston 82. Such piston includes a cam-engageable pin 83, at one end thereof. Piston 82 moves within an axial bore through body portion 72 of signal 70. Pin 83 may extend through an aperture 67 which connects counter bore 65 and tap 66.

The other pin carrying member, namely stop 90, includes a cylindrical housing 91. This housing also has a threaded lug portion 92 which engages threaded tap 68 of indicator 20. Said tap 68 communicates with counter bore 64 by virtue of aperture 69. Stop housing 91 includes an axial bore 89, which narrows to counter bore 93 at shoulder 94. Slidable within said housing bore is a piston 95, carrying a stem 96 on one side, and a pin 97 on the other. Pin 97, similarly to pin 83, may extend within the axial bore portion of indicator 20, through aperture 69. Piston 95 carries an O-ring for sealing engagement with the wall of bore 89. Spring 98 urges piston 95 and pin 97 toward the position shown in FIG. 2.

Slide valve member 100 includes three piston portions, 101, 102 and 103, each of which carry an annular O-ring for sealing engagement with bore portions 65 and 63 respectively. Piston 101 is the largest of the three, and rides within enlarged counter bore 65. Piston 103 rides within bore 63 and the axially extreme counter bore 64, while piston 102 rides within bore 63 and the centrally disposed counter bore 64. Said pistons are connected by reduced diameter sections 105 and 106. Piston 101 also includes an annular or toroidal cam surface 107. The juncture of counter bore 65 and the centrally disposed portion of counter bore 64 forms a seat at 99.

OPERATION

Assuming that the entire system is operative, the individual indicators would be in substantially the position of FIG. 3. Supply fluid from reservoir 10 flows through conduit 12, to and through control 11. From supply exit 15 of control 11, supply fluid flows through conduit 16 through inlet 21 of the initial indicator 20, by piston 103 and out supply exit 22 and on to the supply inlet of the next series connected indicator. From the supply outlet of the last of the indicators, supply fluid would pass through conduit 23 to both the regulated equipment 30, and to fluid inlet 17 of control 11. Pressure through such inlet 17 retains a valve not shown in member 11 in such a position as to permit suppy fluid to course through said member. Each indicator would also be receiving control fluid under pressure through inlet 25, which fluid has passed through other controls 40. These latter controls permit such control fluid to pass therethrough from a source (not shown) provided that the monitored variable, such as pressure in elements 50, is wihtin set limits. At such time, said control fluid exerts a pressure against the face of piston 101, causing cam surface 107 to force pin 83 on piston 82 radially of the indicator housing, whereby such piston causes, in a known manner, a first color, or other signal to be emitted by signalling member 80. Piston 95 and pin 97 are retained in the position of FIG. 3 by piston 103.

Assume now that a malfunction, such as a line break occurs in one element 50 of FIG. 1, say the middle such element. The pressure drop caused by such malfunction would be sensed by control 40, which would cut off control fluid through conduit 41 to control inlet 25 of the associated indicator 20. Supply fluid through supply inlet 21 acting primarily against piston 102, would push slide valve member 100 to the FIG. 2 position whereby radial movement of piston 82 and of pin 83 into counter bore 65 would cause a different signal to be emitted by signalling device 80. At this time supply fluid from the downstream indicators would be bled through port 62, since communication is established between supply exit 22 and bleedport 62. Since the remaining indicators, at this time would be receiving control fluid, retaining their slide valve member in the FIG. 3 arrangement, supply fluid would be bled from the entire system, causing shutdown, of the controlled function of member 30. Thus all other indicators would remain in their pre-malfunction position, allowing repair personnel to quickly determine the source of the initial malfunction, or first out. Note that stop member 90 may not only indicate the position of its associated slide valve member, but even on the return of control fluid pressure, requires a force radial to bore 63 be exerted, such as a manual force, in order to permit slide valve member 100 to return to the FIG. 3 position. Although only a single embodiment has been described, it should be obvious that numerous modifications can be made by one skilled in the art without departing from the spirit of the invention, the scope of which is limited only by the following claims.

I claim:

1. An indicator comprising:
   I. a housing having bore means substantially there through, said housing also including;
      (a) first fluid inlet,
      (b) first fluid outlet,
      (c) second fluid inlet, and
      (d) first fluid exhaust means, said exhaust means including said first fluid outlet and an exhaust port, each of said inlets, outlets and port being in communicating relationship with said bore means;
   II. Valve means slidable in said bore means between a first position permitting fluid communication between said first fluid inlet and first fluid outlet, and a second position both preventing such fluid communication as well as permitting fluid communication between said first fluid outlet and said exhaust port; and
   III. removable barrier means for blocking movement of said valve means from its said second position to its said first position, said barrier means being removable by fluid pressure in said first inlet and said valve means being movable from said second position to said first position upon sufficient fluid pressure in said second inlet to overcome said fluid pressure in said first inlet.

2. The indicator of claim 1, further comprising signalling means for indicating the first and second positions of said valve means, in the first position, the signal emitted by said signalling means being a function of both the exertion of said second fluid pressure against one end of said valve means and the exertion of said first fluid pressure against and barrier means, and in the second position, the signal emitted by said signalling means being a function of the loss of said second fluid pressure.

3. The apparatus in claim 2, wherein said signalling means comprises:
   I. a signal body affixed to said indicator housing, a piston member slidable within said signal body and extending partially within said housing bore means, and plural emitting means in said signal body operable as a function of the position of piston member whereby on said piston member occupying a first position, a first signal is emitted and on said piston member occupying a second position, a second signal is emitted; and
   II. a cam portion provided said valve means in contactable relation to one end of said signal body piston member, said cam portion adapted to position said signal body piston member between its plural position when said valve means shifts between its two positions.

4. The indicator of claim 1, wherein said barrier means further comprises:
   I. a detent housing engaged with said indicator housing, said detent housing having a central bore with a spring bias detent pin slidable within said detent housing bore and removably extendable at least partially within said indicating housing bore means in the path of said valve means, and removable from said path upon said first fluid pressure being exerted on said detent pin.

* * * * *